United States Patent [19]
Nakata et al.

[11] Patent Number: 5,463,707
[45] Date of Patent: Oct. 31, 1995

[54] OPTICAL FIBER RECEPTACLE AND METHOD OF PRODUCING THE SAME

[75] Inventors: Naotaro Nakata; Naofumi Aoki, both of Kyoto; Kenji Okada, Tokyo, all of Japan

[73] Assignees: Rohm Co., Ltd., Kyoto; Nippon Telegraph & Telephone Corporation, Tokyo, both of Japan

[21] Appl. No.: 295,453

[22] Filed: Aug. 24, 1994

[30] Foreign Application Priority Data

Aug. 25, 1993 [JP] Japan ................... 5-210655

[51] Int. Cl.⁶ ................................. G02B 6/42
[52] U.S. Cl. .......................... 385/35; 385/33; 385/34; 385/77; 385/78; 385/88; 385/93; 385/85; 385/52
[58] Field of Search ................... 385/31, 33, 34, 385/35, 39, 52, 76, 77, 78, 79, 80, 85, 88, 92, 93, 139

[56] References Cited

U.S. PATENT DOCUMENTS

| | | | |
|---|---|---|---|
| 4,790,618 | 12/1988 | Abe | 385/93 X |
| 4,836,635 | 6/1989 | DeAmorim | 385/93 X |
| 5,046,798 | 9/1991 | Yagiu et al. | 385/34 X |
| 5,068,865 | 11/1991 | Ohshima et al. | 385/34 X |
| 5,073,047 | 12/1991 | Suzuki et al. | 385/93 |
| 5,127,074 | 6/1992 | Watanabe et al. | 385/93 |
| 5,150,230 | 9/1992 | Masuko et al. | 385/34 X |
| 5,278,929 | 1/1994 | Tanisawa et al. | 385/93 |
| 5,315,609 | 5/1994 | Tanaka et al. | 385/34 X |
| 5,333,224 | 7/1994 | Kikuchi | 385/93 |
| 5,353,294 | 10/1994 | Shigeno | 385/34 X |

FOREIGN PATENT DOCUMENTS

| | | | |
|---|---|---|---|
| 58-144806 | 8/1983 | Japan | 385/34 X |
| 62-18508 | 1/1987 | Japan | 385/34 X |

*Primary Examiner*—Brian Healy
*Attorney, Agent, or Firm*—Brumbaugh, Graves Donohue & Raymond

[57] ABSTRACT

An optical fiber receptacle has a glass rod lens in its one end side and a front end of an optical fiber to be connected to the opposite end side of the receptcle is brought into physical contact with a spherical surface of the glass rod lens to thereby make the optical fiber optically couple with an optical element to be provided on the glass rod lens side, wherein a housing including a sleeve for insertion of the front end of the optical fiber therein is fixed to a lens holder for fixedly holding the glass rod lens by fusion so that the center of the sleeve and the center of the spherical surface of the glass rod lens are aligned.

6 Claims, 5 Drawing Sheets

OPTICAL FIBER RECEPTACLE AND METHOD OF PRODUCING THE SAME

BACKGROUND OF THE INVENTION

The present invention relates to an optical fiber receptacle and a method of producing the same. More specifically, it relates to an optical fiber receptacle used in a terminal for an optical communication subscriber such as a home, an office, or a factory and for optically connecting an optical fiber to a light-emitting element or a light-receiving element, and particularly relates to an optical fiber receptacle in which a glass rod lens fixed in its inside and an optical fiber are aligned certainly, and a method of producing the same.

Optical communication has been popularized rapidly in recent years so as to be utilized in personal use for telephones, facsimiles and so on, and also in mass-media for television information and so on. In order to connect a signal from an optical fiber as an optical signal transmission medium to a home telephone or the like, a terminal device is set. In the terminal device, the optical fiber is optically connected to a light-receiving element for reception and to a light-emitting element for transmission. The light-receiving element and the light-emitting element perform conversion between an electric signal and an optical signal.

A schematic view of a structure considered as the structure of the aforementioned terminal device at the present time is shown in FIG. 9. In FIG. 9, reference numeral 52 designates an optical fiber receptacle which is formed so that a glass rod lens 51 is provided at one end side thereof and a connector of an optical fiber 53 is to be connected to the other end side by a push-on type joining method or the like. A light-emitting element 54 and a light-receiving element 55 are arranged in the front of the glass rod lens 51 through a half mirror 56 so as to be connected respectively efficiently. The whole of those parts is covered with a casing 57. Examples of the optical fiber used include a single mode fiber and a multi-mode fiber. The single mode fiber has a very small core diameter of from 9 to 10 μm and the multi-mode fiber has also a very small core diameter of about 50 μm. In order to connect the light-emitting element 54 and the light-receiving element 55 to the optical fiber efficiently, as shown in FIG. 9, the optical fiber is once connected to the glass rod lens 51 before the glass rod lens 51 is connected to the light-emitting element 54 and to the light-receiving element 55. An optical fiber receptacle is used as a simple connector for connecting the optical fiber to the glass rod lens.

In the conventional optical fiber receptacle, the glass rod lens having an outside diameter equal to the outside diameter of a ferrule having a center hole in which the optical fiber is inserted and protected, is inserted and fixed into a cylindrical sleeve having an inside diameter substantially equal to the outside diameters of the ferrule and the glass rod lens, and then the ferrule of a front end portion of the optical fiber is inserted into the sleeve to thereby bring the optical fiber into physical contact with the glass rod lens.

As another structure, a glass rod lens holder is produced with high mechanical accuracy with respect to a ferrule holder, and the holders are fitted and welded after the ferrule and the glass rod lens are inserted into the holders respectively with high accuracy.

A commonly used ferrule for a multi-mode optical fiber has an outside diameter of 2.499 mm ±0.001 mm or from 2.499 mm −0.002 mm to 2.499 mm +0.001 mm. A commonly used ferrule for a single mode optical fiber has an outside diameter of 2.499 mm ±0.0005 mm. As the refractive index of the glass lens, a refractive index near the refractive index (1.452 in the case of a quartz fiber) of the optical fiber core is selected.

The outside diametrical portion of the glass rod lens must be machined and polished with the same accuracy as that of the ferrule in order to insert the glass rod lens into the same and one sleeve while making the center axis of the glass rod lens coincident with the center axis of the ferrule. However, it is very difficult to machine and polish the glass rod lens with the same accuracy as that of the ferrule.

Further, in the case where an end of a cylinder is polished spherically in mechanical machining or the like, it is generally impossible that the center of the spherical surface thus spherically polished is made perfectly coincident with the center axis (the center axis of the outside diametrical portion of the cylindrical glass lens) of the cylinder. As a result, eccentricity is produced. Thus, there arises a problem that coupling of the eccentric glass lens and the optical fiber becomes unstable to cause an increase in reflection loss even in the case where the eccentricity produced is slight. Even in the case where the high accuracy machining method in the present circumstances is used, the accuracy of the outside diametrical portion and the eccentric accuracy are respectively limited to the order of tens of μm. In a try and error state, the eccentricity of about 50 μm is produced as the eccentricity of the abutment surface due to the aforementioned accuracy. There also arises a problem that there is no simple and accurate method to reduce the eccentricity through adjustment.

SUMMARY OF THE INVENTION

An object of the present invention is to solve the aforementioned problems, that is, to provide an optical fiber receptacle in which sufficiently good physical contact can be obtained so as to maintain a small insertion loss even in the case where a glass rod lens contained in the optical fiber receptacle is eccentric in a degree substantially equal to the error produced by an ordinary machining method so that the center of the spherically polished surface of the glass rod lens is not coincident with the center axis of the outside diametrical portion of the glass rod lens, that is, even in the case where the glass rod lens low in machining accuracy but low in cost is used. Another object of the present invention is to provide a method of producing the same.

Incidentally, the error produced by an ordinary machining method means the case where the error of the outside diameter of the glass rod lens is in a range of ±0.1 mm and where the eccentric angle (the angle between the center axis of the outside diametrical portion of the glass rod lens and a segment connecting the focal point and the center of the spherical surface) is not larger than three minutes.

In an optical fiber receptacle according to the present invention, a glass rod lens is provided at one end side thereof and a front end of an optical fiber to be connected to the other end side thereof is brought into physical contact with a spherical surface of the glass rod lens to thereby make the optical fiber optically couple with an optical element provided at the glass rod lens side, wherein a housing including a sleeve into which the front end of the optical fiber is to be inserted and a lens holder to which the glass rod lens are fixedly attached, are fixed to each other in a condition that the center axis of the sleeve and the center of the spherical surface of the glass rod lens are aligned.

The physical contact used herein means connection in which a core of an optical fiber is brought into close contact with a lens or a ferrule end surface by polishing the lens or the ferrule end surface into a convex spherical surface to thereby avoid Fresnel reflection.

The aforementioned glass rod lens may be a flat-convex lens having a spherical surface formed on its one side contacting with the optical fiber and a flat surface formed on its other side opposite to the contacting side.

Alternatively, if the aforementioned glass rod lens is a double convex lens having a spherical surface formed on its one side contacting with the optical fiber and the other spherical surface formed on the other side opposite to the contacting side, it is desirable in that the lens can be made to have a light-condensing function.

A method of producing an optical fiber receptacle according to the present invention in which a glass rod lens is provided on its one end side and a front end of an optical fiber to be connected to its other end side is brought into physical contact with a spherical surface of the glass rod lens to thereby make the optical fiber optically couple with an optical element provided at the glass rod lens side, wherein the method is characterized by the steps of:

inserting a ferrule having a center hole into a sleeve provided in a center portion of a housing, making a laser beam pass through the center hole of the ferrule and positioning a laser light source and the housing so that the quantity of transmitted light is maximized;

removing the ferrule from the sleeve;

observing a reflection spot of the laser beam while a lens holder fixedly holding the glass rod lens is gripped by a chuck which is finely adjustable and rotatable in a plane perpendicular to the laser beam and while the lens holder is rotated in a condition that it is made to abut against the housing;

repeating the adjustment of the position of the lens holder so that a small circle drawn by the reflection spot is reduced like a point; and fixing the lens holder by welding at the position in which a locus drawn by the reflection spot becomes a point.

Another method of producing an optical fiber receptacle according to the present invention is characterized by the steps of:

inserting a reference lens having an end surface polished spherically and having an outside diametrical portion machined accurately, into a sleeve provided in a center portion of a housing;

making a lens holder having the glass rod lens fixedly attached thereto abut against the housing so that the spherical surface of the glass rod lens is brought into contact with the spherical surface of the reference lens;

radiating a laser beam or monochromatic light onto the glass rod lens from its one side opposite to its surface contacting with the reference lens; and positioning the lens holder so that the center of a Newton ring formed by the laser beam or monochromatic light is coincident with the center of the sleeve, and then fixing the lens holder by welding.

Preferably, the glass rod lens has a spherical surface formed on its side opposite to its surface contacting with the reference lens so that the glass rod lens has a light-condensing function, and the positioning of the lens holder is performed while the Newton ring is observed with an infinite-point correction microscope formed by removing an objective lens.

In the optical fiber receptacle according to the present invention, the housing for supporting the sleeve in its inside and the lens holder for fixedly holding the glass rod lens are fixed to each other by means of welding or the like after the center axis of the sleeve and the spherical center of the contact surface of the glass rod lens are aligned. Accordingly, good physical contact between the optical fiber and the glass rod lens is obtained by simply inserting an end of the optical fiber into the sleeve. Accordingly, a coupler high in coupling efficiency is produced.

In the optical fiber receptacle producing method according to the present invention, the position of the lens holder is adjusted to make the locus drawn by the reflection spot become a point by observing the reflection spot of the laser beam while radiating the laser beam onto the center axis of the sleeve and while rotating the glass rod lens fixedly held by a lens holder in a condition that the glass rod lens is made to abut against the sleeve. Accordingly, the center axis of the sleeve and the center of the spherical surface of the glass rod lens are perfectly aligned regardless of the concentricity between the spherical surface of the glass rod lens and the outside diametrical portion thereof. That is, if the alignment is not made perfect, the laser beam strikes on the spherical surface obliquely, so that the reflected light is slipped off from the optical path of the laser beam. As a result, the reflection spot draws a circle by the rotation of the lens. On the contrary, when the alignment is made perfect, the reflected light of the laser beam always moves back in the same optical path as that of the output beam, so that the locus of the reflection spot becomes a point.

In the second producing method according to the present invention, a reference lens accurately adjusted with respect to the center of the outside diametrical portion and the center of the spherical surface is inserted into the sleeve and then the glass rod lens is fixed after the position of the glass rod lens is adjusted to make the center of the Newton ring coincident with the center of the reference lens by observing the Newton ring formed by the laser beam while making the spherical surface of the glass rod lens abut against the spherical surface of the reference lens. Accordingly, the center axis of the sleeve and the center of the spherical surface of the glass rod lens are aligned perfectly in the same manner as in the first producing method regardless of the concentricity between the spherical surface of the glass rod lens and the outside diametrical portion thereof. In addition, since the object of the present invention can be attained by production of only one reference lens, the receptacle can be assembled at low cost and with ease.

DETAILED DESCRIPTION OF THE PREFERRED EMBODIMENTS

The preferred embodiments of an optical fiber receptacle and a method of producing the same will be described below with reference to the accompanying drawings.

Figure 1:
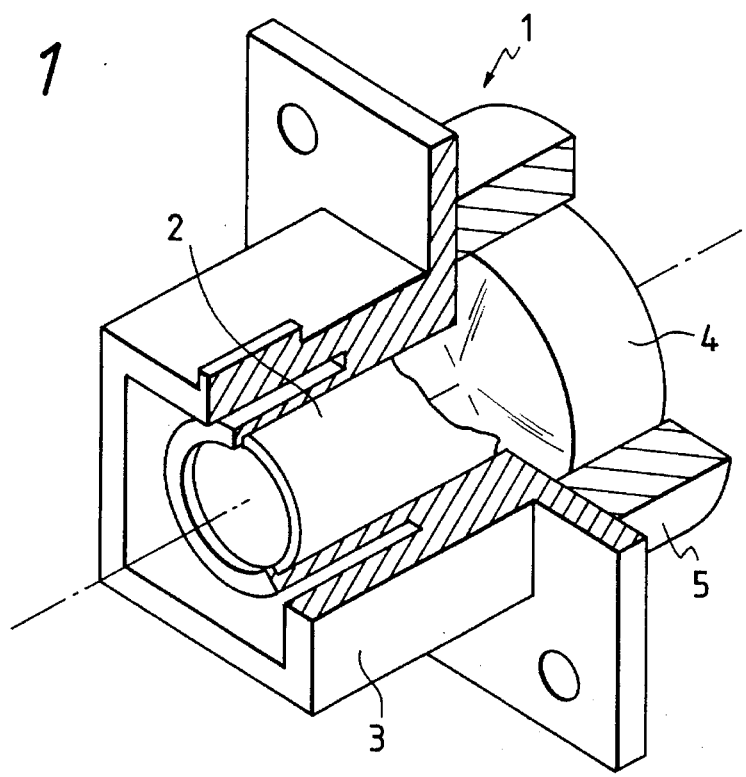
FIG. 1 is a partly cutaway perspective view of an embodiment of a receptacle according to the present invention.

FIG. 1 is a partly cutaway perspective view of an embodiment of an optical fiber receptacle (hereinafter referred to as "receptacle") according to the present invention.

In the receptacle 1 according to the present invention, a lens holder 5 to which a glass rod lens 4 is fixed by means of fusion, adhesion or the like, is fixed by means of welding or the like to a housing 3 including a sleeve 2 into which a front end of an optical fiber is inserted, in a state in which the sleeve 2 and the glass rod lens 4 are aligned.

After the glass rod lens 4 is aligned with accuracy of not lower than 5 μm with respect to the center of the sleeve 2 by a method which will be described later, the lens holder 5 is fixed to the housing 3 by means of welding or the like. The sleeve 2 made of zirconia or the like has spring characteristics at a certain degree and is formed to have just a diameter which is suitable for insertion of a ferrule portion of the optical fiber. Accordingly, when an optical fiber connector is inserted and the receptacle 1 is fixed to the optical fiber, for example, by a push-on joining method, the center of the core of the optical fiber coincides with the center of the sleeve 2 with accuracy of not lower than 2 μm and, at the same time, the size of the sleeve 2 is formed so that the end of the ferrule of the optical fiber is brought into physical contact with the glass rod lens when the optical fiber is inserted. The receptacle according to the present invention is constructed through fixing of parts so that the center of the sleeve 2 is aligned with the center of the spherical surface of the glass rod lens 4 with accuracy of not lower than 5 μm. Accordingly, even in the case where an arbitrary optical fiber is connected, the center of the core of the optical fiber is always brought into physical contact with the center of the spherical surface of the glass rod lens with accuracy of not larger than 7 μm. Further, because the lens holder is fixed so that the center of the spherical surface of the glass rod lens is aligned, accuracy in machining the outside diametrical portion of the glass rod lens is not required and reduction in cost can be attained.

A method of producing the receptacle after aligning the sleeve 2 and the glass rod lens 4 will be described.

Embodiment 1

Figure 2:
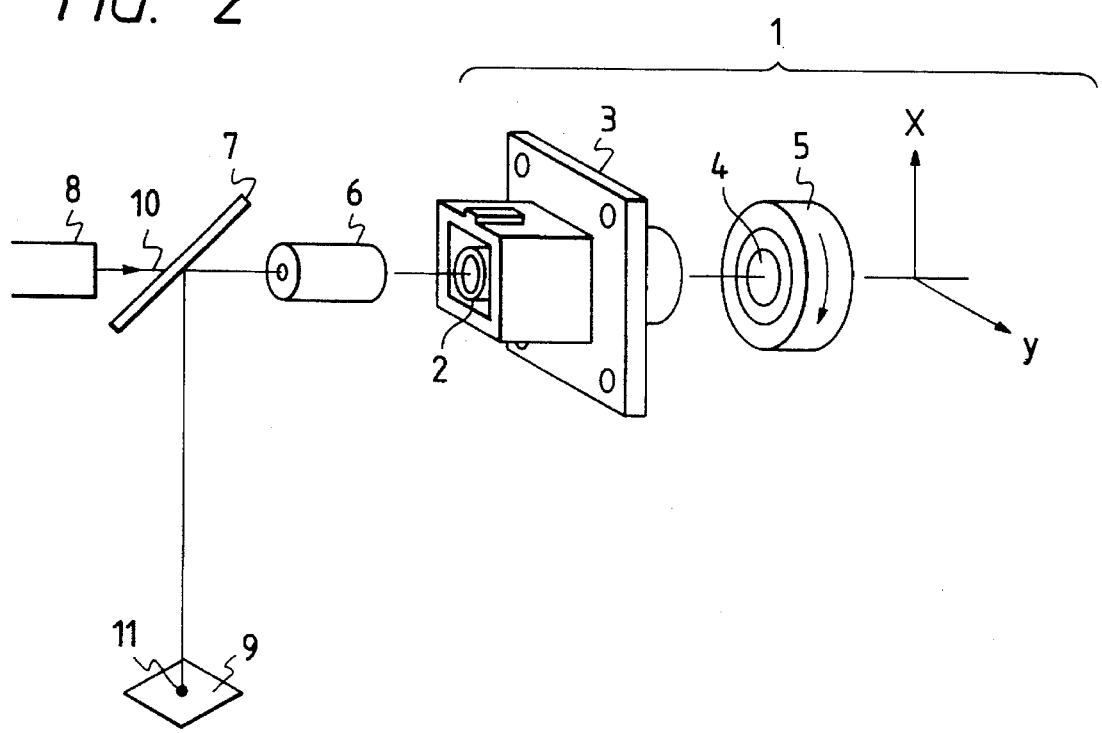
FIG. 2 is an exploded explanatory view showing a first embodiment of a method of producing a receptacle according to the present invention.
Figure 3:
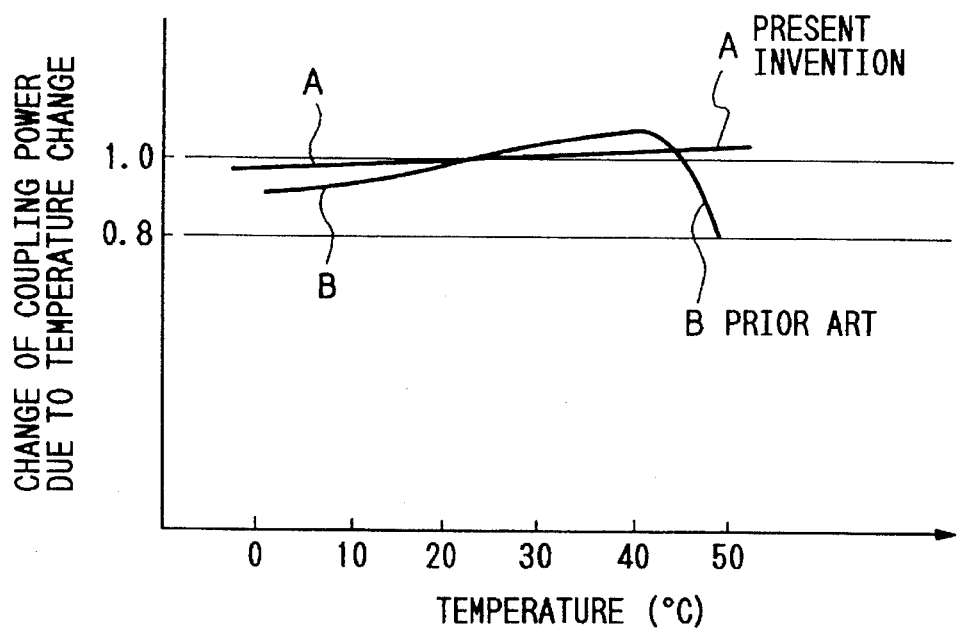
FIG. 3 is a graph showing the temperature characteristics of a single mode fiber connected by the receptacle produced by the method according to the first embodiment in comparison with the case of a conventional receptacle.

FIG. 2 is a view for explaining a first embodiment of a method of producing a receptacle according to the present invention. FIG. 3 is a graph showing the change of optical fiber coupling power of the receptacle due to the change of temperature.

In FIG. 2, reference numerals 1 to 5 designate parts equivalent to the parts in FIG. 1, 6 designates a ferrule, 7 designates a half mirror, 8 designates a laser light source such as a He—Ne laser light source, 9 designates a screen and 10 designates a laser beam.

The glass rod lens 4 is fixed to the center portion of the lens holder 5 by means of fusion, adhesion or the like. The lens holder 5 is gripped by a chuck (not shown) which is finely adjustable and rotatable in an x-y plane perpendicular to the laser beam 10, and the lens holder 5 is adjusted finely while being rotated.

The sleeve 2 is provided in the center portion of the housing 3. First, in order to specify the center axis of the sleeve 2, the ferrule 6 into which the optical fiber has not been inserted yet is inserted into the sleeve 2 and then the laser beam 10 is radiated toward the center hole of the ferrule 6. At a time when the quantity of transmitted light through the ferrule 6 reaches its maximum, the relative positions of the laser light source 8 and the housing 3 are fixed so that the respective positions of the laser light source 8 and the housing 3 are determined. At this time, the center axis of the sleeve 2 is considered to be coincident with the laser beam 10.

Then, the ferrule 6 is removed from the sleeve 2. The glass rod lens 4 fixed to the lens holder 5 by fusion is set so that the center axis of the outside diametrical portion (effective diameter) of the glass rod lens 4 is arranged so as to be substantially on the laser beam 10. While the lens holder 5 is rotated while it is made to abut against the housing 3, a reflection spot 11 of the laser beam 10 is observed on the screen 9. When the laser beam 10 strikes off from the center portion of the spherical surface of the glass rod lens 4, light reflected on the spherical surface advances obliquely so that the reflection spot 11 formed on the screen 9 draws a small circle because the glass rod lens 4 is rotated. Therefore, the fine adjustment of the lens holder 5 in the x-y plane is repeated so that the reflection spot 11 draws a point. At the position where the spot draws the immovable point, the lens holder 5 is fixed to the housing 3 by welding, for example, by using an YAG laser or the like.

As described above, with respect to accuracy in machining the glass rod lens in the existing circumstances, the accuracy of the outside diametrical portion of the glass lens and the error between the spherical center of the spherically polished surface and the center axis of the outside diametrical portion were respectively of the order of tens of μm even in the case where a high-accuracy machining method was used. Accordingly, eccentricity of the order of 50 μm was produced in the abutment surface between the glass lens and the optical fiber. On the contrary, by the producing method according to the present invention, the eccentricity was reduced to be not larger than 5 μm.

When, for example, a transmission/reception unit was assembled by inserting a single mode fiber into a receptacle produced by the method of the present invention and having eccentricity of not larger than 5 μm, the dispersion of optical fiber coupling power was in a range of ±5% and the reflection loss was not larger than −35 dB, that is, the reflection loss was stably low. On the contrary, when a unit was assembled by using a conventional receptacle having eccentricity of 50 μm, the dispersion of optical fiber coupling power was in a range of ±30% and the reflection loss was −30 dB.

In FIG. 3, the change of optical fiber coupling power (curve A) in the case where temperature was changed in a transmission/reception unit assembled by inserting a single mode fiber into the aforementioned receptacle according to the present invention and the change of optical fiber coupling power (curve B) in the case where temperature was changed in a conventional receptacle in the same manner as described above are expressed under the assumption that the respective values thereof at room temperature are 1. In the curve A showing the embodiment of the present invention, relatively stable power was maintained, so that the change thereof was in a range of ±3%. On the contrary, in the curve B showing the conventional case, reduction of power was started at 40° C. and then power was reduced by 20% to 0.8 at 50° C.

Embodiment 2

Another embodiment of the receptacle producing method according to the present invention will be described below with reference to FIGS. 4 through 6.

Figure 4:
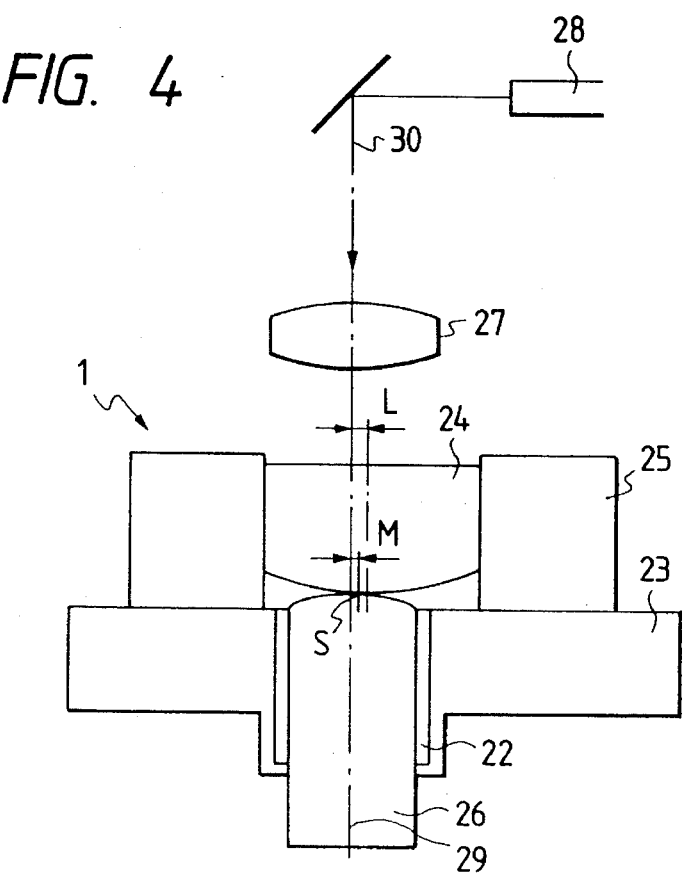
FIG. 4 is a sectional explanatory view showing a second embodiment of a method of producing a receptacle according to the present invention.

In FIG. 4, a housing 23 holding a sleeve 22 in its inside and a lens holder 25 holding a glass rod lens 24 in its center portion by means of fusion, adhesion or the like are fixed to each other by means of welding or the like to thereby form a receptacle 1. Reference numeral 26 designates a reference lens constituted by a master glass rod lens or a master ferrule having a fiber core in its center portion etc., which is aligned with high accuracy so that the center of the spherical surface formed in the contact surface between the reference lens 26 and the glass rod lens 24 is coincident with the center axis of the outside diametrical portion of the reference lens 26. The reference lens 26 has a function of shifting the center axis of the sleeve 22 to the center of the spherical surface of the reference lens 26. Reference numeral 27 designates an objective lens of a microscope, 28 designates a laser light source and 30 designates a laser beam.

In this embodiment, the contact point between the glass rod lens 24 and the reference lens 26 can be positioned on the center axis of the sleeve 22 easily with high accuracy by using the reference lens 26 of high accuracy even in the case where the glass rod lens 24 is machined with low accuracy. Accordingly, a receptacle having stable coupling characteristics can be produced by using the low-cost glass lens.

The glass rod lens 24 is fixed to the center portion of the lens holder 25 by means of fusion, adhesion or the like. The lens holder 25 is gripped by a chuck (not shown) which is finely adjustable in an x-y plane perpendicular to the center axis 29 of the reference lens 26. The laser beam 30 is radiated onto the center axis 29 of the reference lens 26. A Newton ring formed around the contact point S by interference in the contact surface of the convex spherical surface is observed by the microscop to thereby perform alignment of the glass rod lens 24.

First, the reference lens 26 having an end surface polished spherically and being machined accurately so that the center of the radius of the spherical surface and that of the outside diametrical portion thereof are coincident with each other, is inserted into the sleeve 22 provided in the center portion of the housing 23. The lens holder 25 is made to abut on the housing 23 so that the spherical surface of the glass rod lens 24 is brought into contact with the spherical surface of the reference lens 26. The laser beam 30 is radiated from the rear side (the side opposite to the contact surface between the glass rod lens 24 and the reference lens 26) of the glass rod lens 24.

The laser beam is coherent so that it can generate clear interference fringes. For example, by using a He—Ne laser, a semiconductor laser or the like as the laser light source 28, very clear interference fringes can be provided. Even in the case where the laser light source is replaced by a light source such as a tungsten lamp, the same clear interference fringes as described above can be generated as long as light is changed into monochromatic light by means of a filter or the like. The theory of alignment of the glass rod lens by using a Newton ring will be described below.

Figure 5:
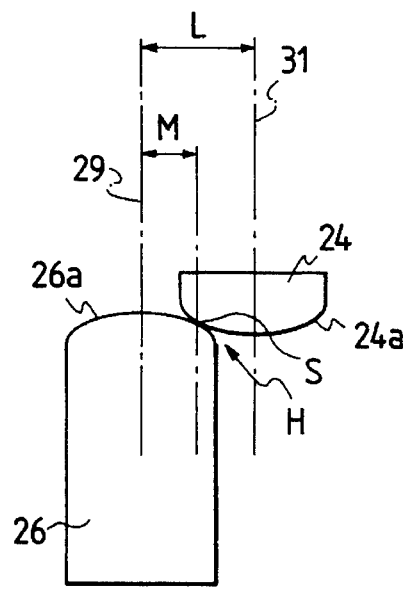
FIG. 5 is a view for explaining important parts of FIG. 4.
Figure 6:
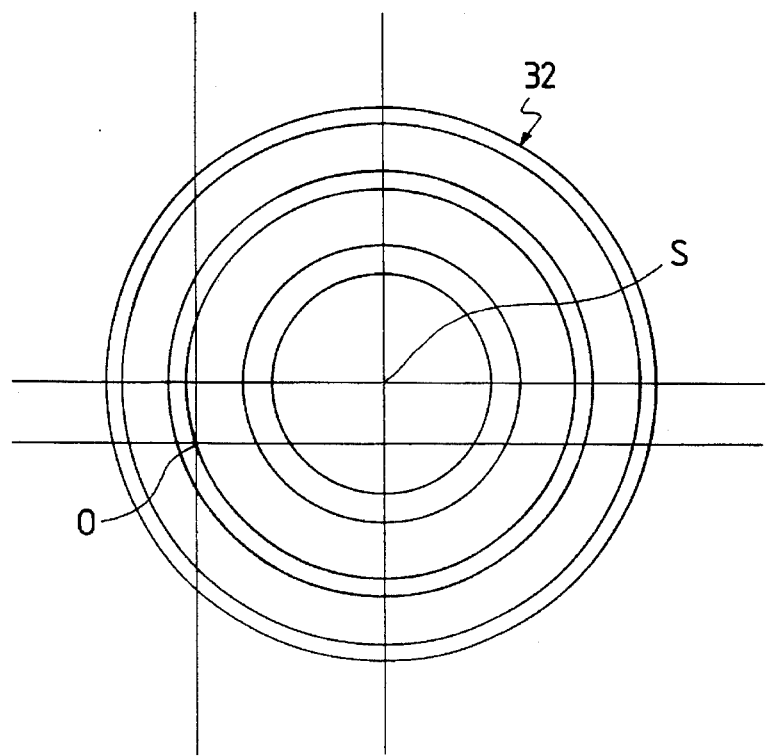
FIG. 6 is a view for explaining a Newton ring in the producing method according to the second embodiment.

As shown in FIG. 5, assuming now that one end 26a of the reference lens 26 has the same radius as the spherical surface 24a of the glass rod lens 24 and that the center axis 29 of the reference lens 26 is eccentric to the center axis 31 of the glass rod lens 24 by distance L, then the distance M between the contact point S and the center axis 29 of the reference lens 26 is M=L/2 and the periphery H of the contact point S forms a void. Because the distance of the void increases as the distance from the contact point S increases, interference is produced by the optical path difference between light reflected on the end surface 26a of the reference lens 26 and light reflected on the spherical surface 24a of the glass rod lens 24. Thus, a Newton ring 32 as shown in FIG. 6 is formed around the contact point S.

On the other hand, the master ferrule is inserted into the sleeve 22 and the center of the sleeve is determined in advance. If the position of the lens holder 25 is adjusted so that the center O of the sleeve 22 is coincident with the center (contact point S) of the Newton ring 32, the center axis 29 of the reference lens 26 coincides with the center axis 31 of the spherical surface of the glass rod lens 24 without any eccentricity.

Then, the thus aligned lens holder 25 is fixed to the housing 23 by means of welding or the like by using a YAG laser or the like.

In the producing method according to this embodiment of the present invention, if one reference lens is machined with high accuracy in advance, it can be used successively. A low-accuracy glass rod lens in which the center axis of the outside diametrical portion thereof is not coincident with that of the spherical surface thereof can be used as the glass rod lens. Accordingly, not only the optical fiber receptacle can be obtained at low cost but also stable coupling characteristics can be obtained so that the reflection loss can be reduced.

Figure 7:
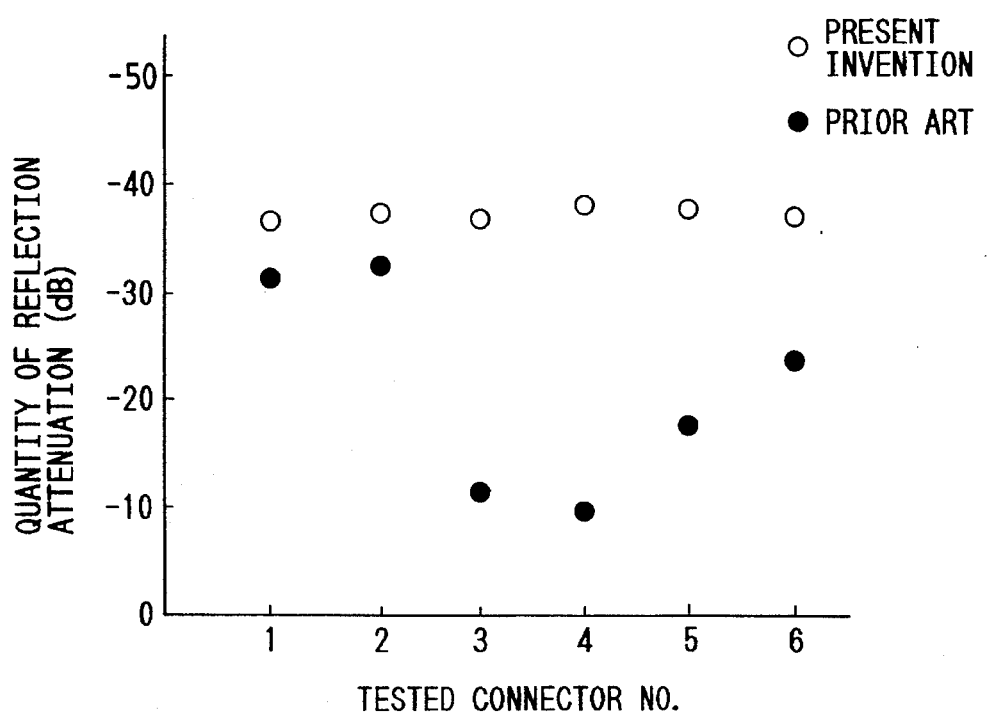
FIG. 7 is a graph showing the quantities of reflection attenuation of connectors connected by the receptacle produced according to the second embodiment of the present invention in comparison with the case of a conventional receptacle.
Figure 8:
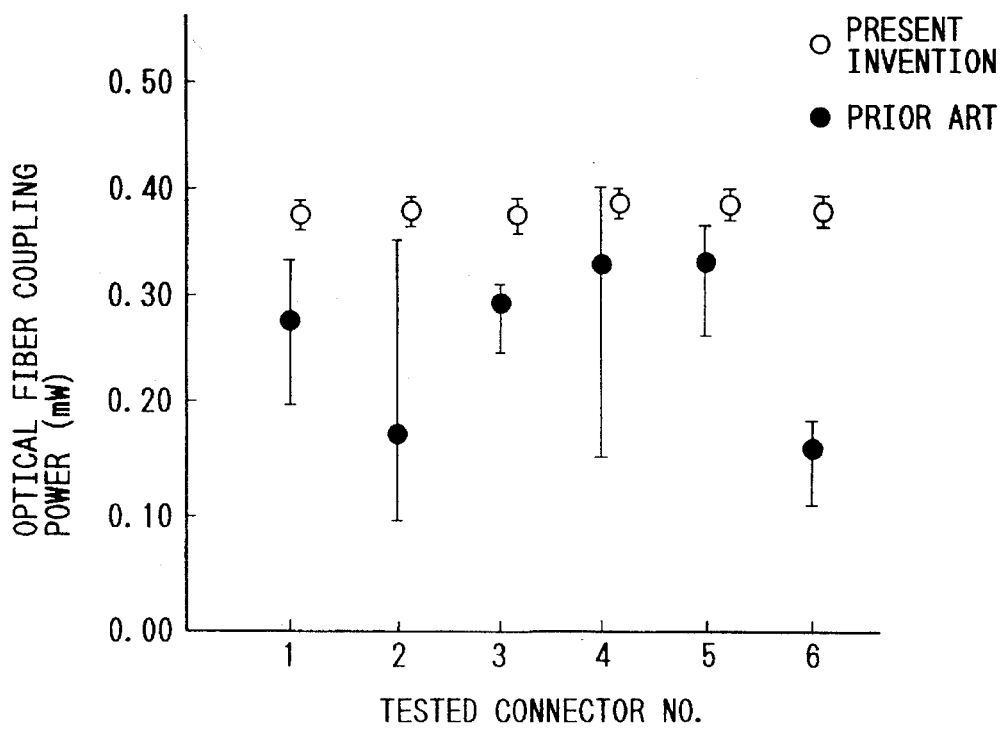
FIG. 8 is a graph showing the optical fiber coupling power of connectors connected by the receptacle produced according to the second embodiment of the present invention in comparison with the case of a conventional receptacle.
Figure 9:
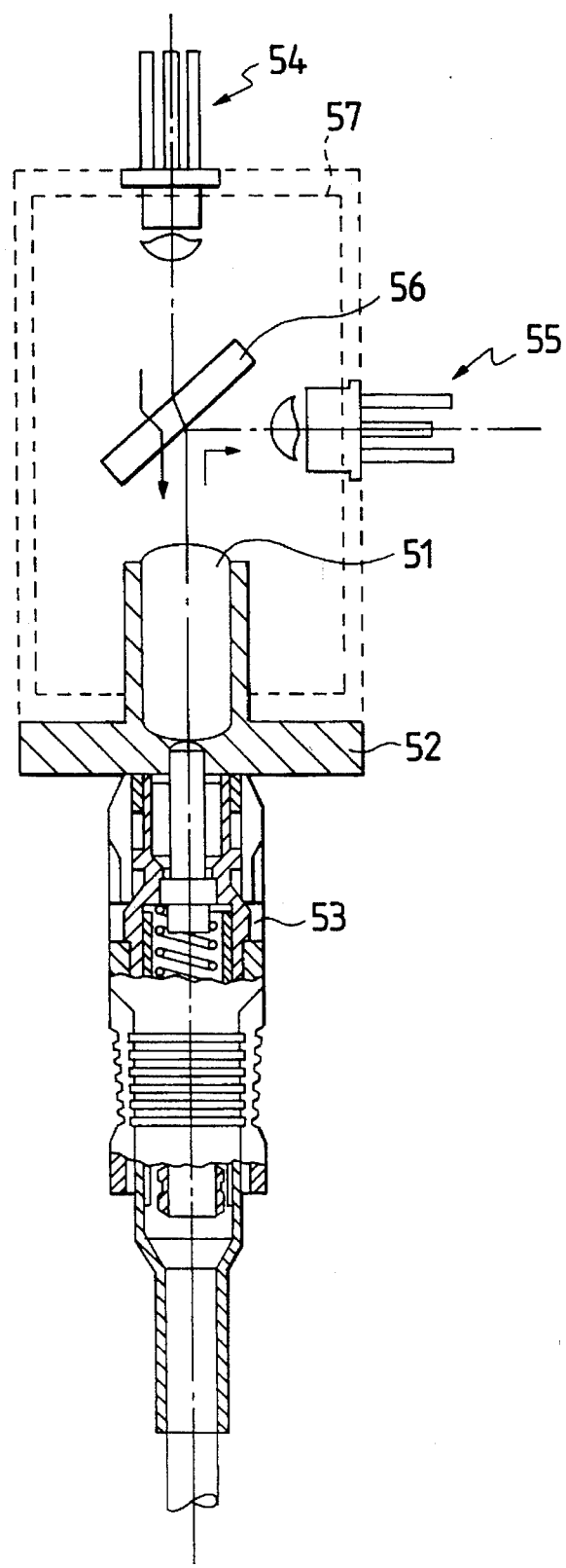
FIG. 9 is a schematic view of an optical communication terminal device.

For example, FIGS. 7 and 8 show the quantities of reflection attenuation and the values of optical fiber coupling power for comparison in the case where various connectors are connected to the receptacle produced by the method according to the embodiment of the present invention and to the conventional receptacle, respectively. In each of the graphs, the abscissa represents the connector number of the optical fiber tested.

The graph of FIG. 7 shows comparison of the quantities of reflection attenuation. In the graph, white dots show the case where the receptacle according to the embodiment of the present invention is used, and black dots show the case where the conventional receptacle is used. In the case of the receptacle produced according to the embodiment of the present invention, the quantity of reflection attenuation is stable to all connectors and kept in a small value.

Similarly, FIG. 8 shows comparison between the optical fiber coupling power (white dots) of the receptacle according to the embodiment of the present invention and the optical fiber coupling power (black dots) of the conventional receptacle. In FIG. 8, each of the vertical segments shows dispersion of measured values in the case where attachment/detachment is repeated by 16 times to make 16 measurements per one connector, and each of the dots shows the average of the measured values. In the case of the receptacle produced by the method according to the embodiment of the present invention, the optical fiber coupling power is stable regardless of the connecting style and exhibits a large value. Accordingly, the occurrence of dispersion during usage can be avoided.

Embodiment 3

Although the aforementioned embodiment showed the case where the rear surface of the glass rod lens 24 was shaped like a plane, this embodiment shows the case where positioning was performed in the same manner as described above after the rear surface was shaped like a sphere in order to provide a light-condensing function. As a result, alignment of the sleeve and the glass rod lens could be performed in the same manner as described above by using an infinite-point correction microscope formed by removing an objective lens as a microscope for observing the Newton ring.

As described above, in the receptacle and the method of producing the same according to the present invention, not only the glass rod lens can be machined easily but also measurement and assembling can be performed by an ordinary simple method, so that the receptacle subjected to alignment with high accuracy can be produced at low cost.

As a result, a stable, high-performance and high-quality receptacle small in reflection loss and high in optical fiber coupling power can be obtained at low cost to thereby make a great contribution to the popularization of optical communication and the development of optical measurement apparatuses.

What is claimed is:

1. An optical fiber receptacle, comprising:
    a glass rod lens provided on one end side of said receptacle so that a front end of an optical fiber to be connected to the other end side of said receptacle is brought into physical contact with a spherical surface of said glass rod lens to thereby make said optical fiber optically couple with an optical element to be provided at a side of said glass rod lens;
    a sleeve into which the front end of said optical fiber is to be inserted;
    a housing including said sleeve; and
    a lens holder to which said glass rod lens is fixedly attached in a condition that a center axis of said sleeve and a center of said spherical surface of said glass rod lens are aligned.

2. An optical fiber receptacle according to claim 1, wherein said glass rod lens is a flat-convex lens having a spherical surface formed on its one side contacting with said optical fiber and a flat surface formed on its other side opposite to the contacting side.

3. An optical fiber receptacle according to claim 1, wherein said glass rod lens is a double convex lens having a spherical surface formed on its one side contacting with said optical fiber and the other spherical surface formed in the other side opposite to the contacting side so as to have a light-condensing function.

4. A method of producing an optical fiber receptacle having a glass rod lens provided on one end side of said receptacle so that a front end of an optical fiber to be connected to the other end side of said receptacle is brought into physical contact with a spherical surface of said glass rod lens to thereby make said optical fiber optically couple with an optical element to be provided at a side of said glass rod lens, said method comprising the steps of:
    inserting a ferrule having a center hole into a sleeve provided in a center portion of a housing;
    making a laser beam pass through said center hole of said ferrule;
    positioning a laser light source and said housing so that a quantity of transmitted light is maximized;
    removing said ferrule from said sleeve;
    observing a reflection spot of said laser beam while a lens holder fixedly holding said glass rod lens is gripped by a chuck which is finely adjustable and rotatable in a plane perpendicular to said laser beam and while said lens holder is rotated in a condition that it is made to abut against said housing;
    repeating adjustment of a position of said lens holder so that a small circle drawn by said reflection spot is reduced like a point; and
    fixing said lens holder to said housing by welding at a position at which said reflection spot draws a point.

5. A method of producing an optical fiber receptacle having a glass rod lens provided on one end side of said receptacle so that a front end of an optical fiber to be connected to the other end side of said receptacle is brought into physical contact with a spherical surface of said glass rod lens to thereby make said optical fiber optically couple with an optical element to be provided at a side of said glass rod lens, said method comprising the steps of:
    inserting a reference lens having an end surface polished spherically and having an outside diametrical portion machined accurately, into a sleeve provided in a center portion of a housing;
    making a lens holder having said glass rod lens fixedly attached to said holder abut against said housing so that a spherical surface of said glass rod lens is brought into contact with a spherical surface of said reference lens;
    radiating a laser beam or monochromatic light onto said glass rod lens from its one side opposite to its surface contacting with said reference lens;
    positioning said lens holder so that a center of a Newton ring formed by said laser beam or monochromatic light is coincident with a center of said sleeve; and
    fixing said lens holder to said housing by welding.

6. A method of producing an optical fiber receptacle according to claim 5, wherein said glass rod lens has a spherical surface formed on one side opposite to said surface contacting with said reference lens so that said glass rod lens has a light-condensing function, and wherein said positioning step of said lens holder is performed while the Newton ring is observed with an infinite-point correction microscope formed by removing an objective lens.

* * * * *